United States Patent
Kyles et al.

(10) Patent No.: US 8,416,902 B2
(45) Date of Patent: Apr. 9, 2013

(54) CLOCK AND DATA RECOVERY FOR BURST-MODE SERIAL SIGNALS

(76) Inventors: Ian Kyles, West Linn, OR (US); Eugene Pahomsky, Portland, OR (US)

( * ) Notice: Subject to any disclaimer, the term of this patent is extended or adjusted under 35 U.S.C. 154(b) by 292 days.

(21) Appl. No.: 12/687,414

(22) Filed: Jan. 14, 2010

(65) Prior Publication Data

US 2011/0169540 A1    Jul. 14, 2011

(51) Int. Cl.
     *H04L 7/00*      (2006.01)
(52) U.S. Cl. ........ 375/355; 375/316; 375/326; 375/340; 375/354; 375/371; 455/502; 455/516; 370/503; 370/508; 370/509; 370/510; 370/511; 370/512; 370/513; 370/514; 370/516; 327/141; 327/163; 341/100; 341/111; 714/707; 714/731; 714/762; 714/775; 714/798; 714/814; 714/819; 329/361
(58) Field of Classification Search .................. 375/316, 375/326, 340, 354, 355, 371; 455/502, 516; 370/503, 508, 509, 510, 511, 512, 513, 514, 370/516; 327/141, 163; 341/100, 111; 714/707, 714/731, 762, 775, 798, 814, 819; 329/361
See application file for complete search history.

(56) References Cited

U.S. PATENT DOCUMENTS

| | | | |
|---|---|---|---|
| 7,136,443 B2 | 11/2006 | Vallet et al. | |
| 7,149,269 B2 | 12/2006 | Cranford, Jr. et al. | |
| 7,231,008 B2 | 6/2007 | Choudhury et al. | |
| 7,260,145 B2 | 8/2007 | Blanc et al. | |
| 2005/0091559 A1 | 4/2005 | Vining et al. | |
| 2005/0135518 A1 | 6/2005 | Vallet et al. | |
| 2006/0125665 A1 | 6/2006 | Lin | |
| 2006/0215296 A1 | 9/2006 | Latchman | |
| 2008/0056420 A1 | 3/2008 | Tsukamoto et al. | |
| 2009/0327788 A1 | 12/2009 | Balamurugan et al. | |

OTHER PUBLICATIONS

International Search Report on corresponding PCT application (PCT/US2011/021367) from International Searching Authority (KR) dated Sep. 30, 2011.
Written Opinion on corresponding PCT application (PCT/US2011/021367) from International Searching Authority (KR) dated Sep. 30, 2011.

*Primary Examiner* — Leon Flores
(74) *Attorney, Agent, or Firm* — Klein, O'Neill & Singh, LLP (57) ABSTRACT

A clock and data recovery device recovers data from a sequential stream of data that includes bursts of data separated by gaps. Each burst of data arrives with its own phase and with its own deviation from a nominal frequency. The bursts of data begin with a preamble that is utilized to determine the timing of the burst. The clock and data recovery device determines the timing of a burst of data using signals from one or more demultiplexers or samplers. At the start of each burst of data, sampled input signals are analyzed by an edge detector to determine a sample phase for the burst. A selector utilizes the sample phase determined by the edge detector to choose which of the sampled input signals to use to produce output data signals from the clock and data recovery device.

7 Claims, 5 Drawing Sheets

CLOCK AND DATA RECOVERY FOR BURST-MODE SERIAL SIGNALS

BACKGROUND OF THE INVENTION

The present invention relates generally to clock and data recovery circuits and, more particularly, to clock and data recovery circuits for use with burst-mode signals.

Some communication systems transmit data serially over a channel such as a fiber optic cable. A transmitter in a serial communication system transmits data in a data signal with clocking information signaled implicitly in the timing of transitions in the data signal. A receiver recovers both clock and data from the data signal. The receiver may use many bit times of received data to begin recovering the clock and data. In addition, data may be preceded by or include preambles to aid in recovery of, for example, clock information. This initial locking time is generally of little concern in always-on communication systems, considering that the initial locking time is very short compared to the total time of data communication.

In some serial communication systems, data are grouped in bursts with no signaling between bursts, multiple transmitters may transmit data into the channel at different times, and each transmitter may have independent amplitude and timing characteristics. Since each burst of data may have an arbitrary phase, timing information from a prior burst is generally not of use in locking to a subsequent burst. In addition, as each burst may be relatively short, an initial locking time that was very short compared to the total time of data communication in an always-on communication system may be objectionably long in a burst-mode communication system. Furthermore, since the preambles of bursts are system overhead and do not convey useful data, use of lengthy preambles, for example, to allow for recovery of clock information, may unduly reduce communication bandwidth.

BRIEF SUMMARY OF THE INVENTION

Some aspects of the invention accordingly provide circuits and methods for clock and data recovery with near instantaneous locking.

In one aspect the invention provides a clock and data recovery device including sampling circuitry configured to receive a serial input signal and produce parallel signals by sampling the serial input signal, where multiple samples are produced for each bit time of the serial input signal; phasing circuitry coupled to the parallel signals and configured to produce a phase selection signal indicative of the location of a data transition among the parallel signals; and selection circuitry coupled to the parallel signals and configured to produce at least one signal selected from the parallel signals based on the phase selection signal.

In another aspect the invention provides a method for clock and data recovery, including sampling a serial input signal at distinct time points to produce sampled signals, where multiple time points occur in each bit time of the serial input signal; determining a phase for use in providing output data, the determining a phase comprising finding a data transition in the sampled signals; and providing output data by utilizing the phase to select among the sampled signals.

These and other aspects of the invention are more fully comprehended upon review of this disclosure.

DETAILED DESCRIPTION

Figure 1:
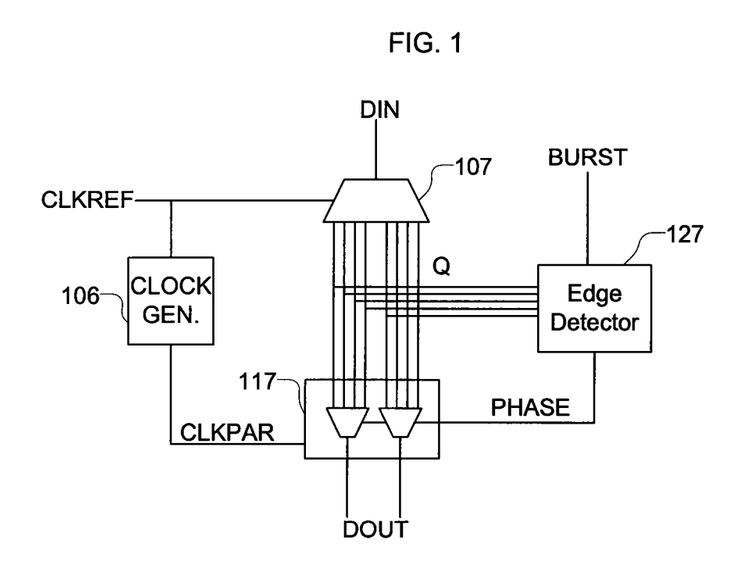
FIG. 1 is a block diagram of a clock and data recovery circuit in accordance with aspects of the invention.

FIG. 1 is a block diagram of a clock and data recovery circuit (CDR) of a receiver in accordance with aspects of the invention. The CDR receives a serial input signal DIN that conveys a serial stream of data bits. The CDR receives data on the serial input signal DIN at a known nominal data rate. For example, the nominal data rate may be 1244.16 Mbps, but the actual data rate may vary, or have a tolerance of, 32 parts per million. The sequential stream of data received by the CDR includes bursts of data separated by gaps in the data. Each burst of data arrives with possibly a deviation from the nominal data rate and a possibly different phase. The bursts of data may begin with a preamble that the CDR may utilize to determine the timing of the burst. In some embodiments, the preamble includes a sequence of alternating ones and zeros.

A demultiplexer 107 of the CDR receives the serial input signal DIN. The demultiplexer 107 also receives a clock signal CLKREF. In one embodiment, the reference clock signal CLKREF received by the demultiplexer 107 oscillates at a frequency approximately four times the nominal data rate of the serial input signal DIN. In another embodiment, the reference clock signal CLKREF is a plurality of signals each oscillating at a frequency approximately the nominal data rate of the serial input signal DIN, with each having a different phase. The demultiplexer 107 produces sampled input signals Q from the serial input signal DIN utilizing the reference clock signal CLKREF. The demultiplexer 107 obtains multiple samples of the serial input signal for each of multiple sequential bit times. As illustrated in the embodiment of FIG. 1, the demultiplexer 107 combines oversampling by a factor of four with deserialization by two to produce eight parallel signals forming the sampled input signals Q. Accordingly, one set of values, or word, of the sampled input signals Q spans two sequential bit times of the input data with four samples per bit time. However, the samples may not be aligned with bit boundaries in the serial input signal DIN. In other embodiments, the demultiplexer 107 may use a different oversampling factor, for example, sixteen, or deserialization bit width.

An edge detector 127 receives a subset of the sampled input signals Q and produces a phase select signal PHASE. The subset of the sampled input signals Q spans approximately one bit time of the serial data. In the embodiment of FIG. 1, the subset of the sampled input signals is five signals. The five signals correspond to consecutive sample time points with the first and last signals in the subset corresponding to sample time points separated by approximately one bit time. The edge detector 127 locates an edge, or data transition, in the subset of the sampled input signals to identify the timing of boundaries between data bits in the serial input signal DIN. The edges in the sampled input signals are the locations where the values of consecutive signals change. In some embodiments, exclusive OR logic gates are coupled to pairs of consecutive signals to identify those with differing values. The outputs of the exclusive OR logic gates may be applied to additional logic gates to encode the edge location, for example, as a binary number. The edges generally correspond to approximate boundaries between bit times. Since samples centered between the boundaries may be less susceptible to corruption by signal noise or timing uncertainty, in some embodiments, the phase select signal PHASE is set to have characteristics that will cause a selector 117 to select samples about centers of bit times from the sampled input signals Q. In other embodiments, the phase select signal PHASE may be set such that the selector 117 selects samples near but not at the center of bit times, for example, if it is expected that samples locations other than central samples will improve sampling reliability.

The edge detector 127 also receives a burst start signal BURST that signals the beginning of each burst of data. The burst start signal may be supplied from a signal detector, for example, based on stabilization of an amplifier producing the serial input signal DIN. The burst start signal BURST in many embodiments has a known timing relative to when the sampled input signals are expected to be reliable. Accordingly, the edge detector 127 sets the phase select signal PHASE at times signaled by the burst start signal BURST and supplies the value to the selector 117 for use throughout a burst. In some embodiments, latches store the encoded edge location at times triggered by the burst start signal BURST to produce the phase select signal PHASE.

The selector 117 receives the sampled input signals Q from the demultiplexer 107 and produces the output data signals DOUT utilizing the phase select signal PHASE from the edge detector 127. The selector 117 selects outputs from the sampled input signals Q beginning with the bit position signaled by the phase select signal PHASE. The number of sampled input signals Q supplied to the output matches the deserialization bit width of the demultiplexer 107, and the selected bits are separated by the oversampling factor. When the oversampling factor is four, as illustrated in embodiment of FIG. 1, every fourth one of the sampled input signals Q is selected. That is, with the sampled input signals Q labeled Q[0] through Q[7], Q[0] and Q[4], Q[1] and Q[5], Q[2] and Q[6], or Q[3] and Q[7] may be selected. In some embodiments, the selector 117 latches the parallel output signals DOUT at times signaled by a parallel clock signal CLKPAR.

Accordingly, the CDR determines the timing phase of a burst of data using the demultiplexer 107 and the edge detector 127. Phase information from the edge detector 127 is used in the selector 117 to choose which signals from the demultiplexer 107 to use to produce the parallel output signals DOUT. The signals from the demultiplexer 107 that will be used to produce the parallel output signals DOUT is determined at the beginning of a burst and held for the duration of the burst.

Clock generation circuitry 106, included some embodiments and as illustrated in FIG. 1, receives the reference clock signal CLKREF and produces the parallel clock signal CLKPAR. The clock generation circuitry 106 produces the parallel clock signal CLKPAR oscillate at a frequency matching the data rate of the sampled input signals Q and parallel output signals DOUT. Accordingly, in the embodiment illustrated in FIG. 1, the parallel clock signal CLKPAR is produced by dividing the reference clock signal CLKREF by eight. In some embodiments, the clock generation circuitry 106 may be considered part of the demultiplexer 107.

FIGS. 2A, 2B, 2C, and 2D are timing diagrams illustrating operation of an embodiment of the CDR of FIG. 1. Each timing diagram shows signals for one word of the sampled input signals Q. All of the timing diagrams include a repeated zero-one sequence on the serial input signal DIN. However, the relative timing of the serial input signal DIN and the parallel clock signal CLKPAR differs in each timing diagram.

Figure 2A:
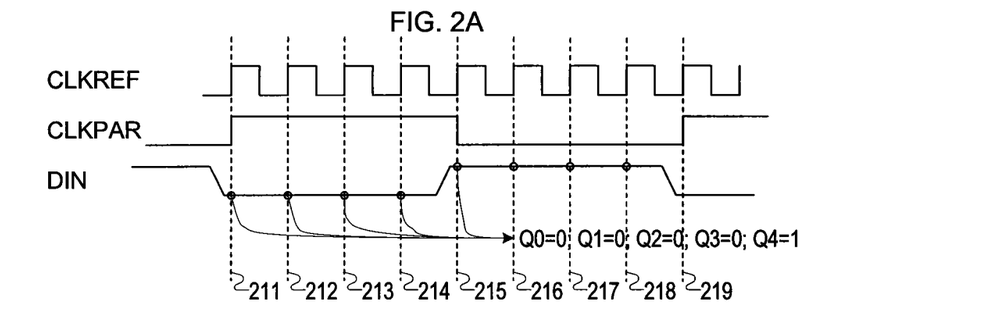
FIGS. 2A, 2B, 2C, and 2D are timing diagrams illustrating operation of a clock and data recovery circuit in accordance with aspects of the invention.

FIG. 2A is a timing diagram that shows operation of the CDR for a first exemplary clock signal and serial input signal timing. FIG. 2A includes first through ninth times 211-219 that are times when the demultiplexer 107 samples the serial input signal DIN. The parallel clock signal CLKPAR has rising edges at the first time 211 and the ninth time 219 and a falling edge at the fifth time 215. The reference clock signal CLKREF, which the demultiplexer 107 uses to control sample timing, oscillates at the oversampling rate and has rising edges at the first through ninth times 211-219. The timing relationships may be more complex than illustrated, for example, there may be substantial time offsets between signal edges.

The serial input signal DIN, in the example timing of FIG. 2A, begins the zero value of the zero-one sequence before the first time 211 and transitions to the one value of the zero-one sequence between the fourth time 214 and the fifth time 215. At the first time 211, the demultiplexer 107 samples the value on the serial input signal DIN to produce a first sampled input signal Q[0]. At the second time 212, the demultiplexer 107 samples the value on the serial input signal DIN to produce a second sampled input signal Q[1]. The demultiplexer 107 continues sampling at each rising edge of the reference clock signal CLKREF until at the eighth time 218, an eighth sampled input signal Q[7] is produced. Since the serial input signal DIN is a zero at the first through fourth times 211-214 and a one at the fifth through eighth times 215-218, the first through fourth sampled input signals Q[0:3] have zero values and the fifth through eighth sampled input signals Q[4:7] have one values.

For the example of FIG. 2A, the edge detector 127 receives the first five sampled input signals Q[0:4] having values 0, 0, 0, 0, 1. Accordingly, the edge detector 127 identifies a data edge at bit position 4 and sets the phase select signal PHASE to 2.

Figure 2B:
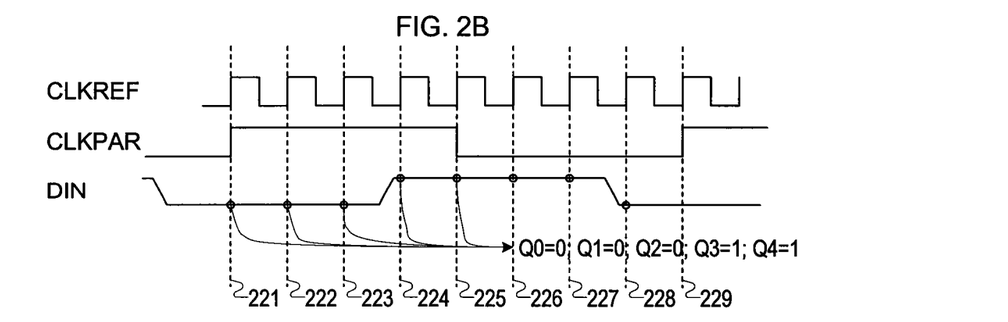

FIG. 2B is a timing diagram that shows operation of the CDR for a second exemplary clock signal and serial input signal timing. FIG. 2B includes first through ninth times 221-229 that are times when the demultiplexer 107 samples the serial input signal DIN. The parallel clock signal CLKPAR has rising edges at the first time 221 and the ninth time 229 and a falling edge at the fifth time 225. The reference clock signal CLKREF has rising edges at the first through ninth times 221-229. The serial input signal DIN is one cycle of the reference clock signal CLKREF earlier in the example timing of FIG. 2B in comparison to FIG. 2A. Accordingly, the serial input signal DIN begins the zero value of the zero-one sequence before the first time 221, transitions to the one value of the zero-one sequence between the third time 223 and the fourth time 224, and transitions back to the zero value between the seventh time 227 and the eighth time 228. The demultiplexer 107 samples the values on the serial input signal DIN at the first through eighth times 221-228 to produce the first through eighth sampled input signals Q[0:7], respectively. Since the serial input signal DIN is a zero at the first through third times 221-223 and a one at the fourth through fifth times 224-225, the first five sampled input signals Q[0:4] have values 0, 0, 0, 1, 1. Accordingly, the edge detector 127 identifies a data edge at bit position 3 and sets the phase select signal PHASE to 1.

Figure 2C:
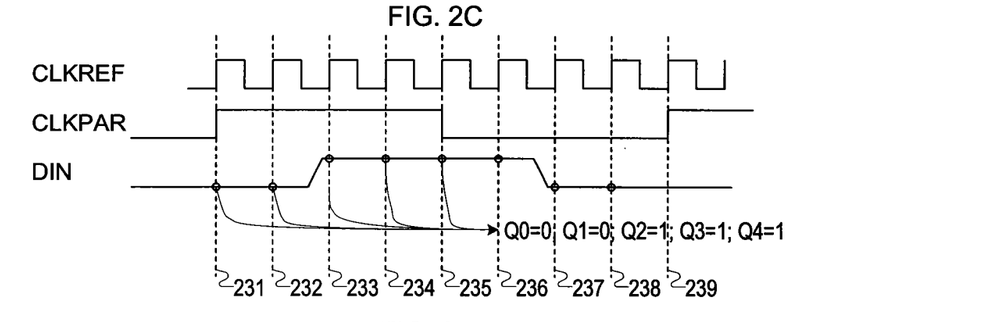

FIG. 2C is a timing diagram that shows operation of the CDR for a third exemplary clock signal and serial input signal timing. FIG. 2C includes first through ninth times 231-239 that are times when the demultiplexer 107 samples the serial input signal DIN. The parallel clock signal CLKPAR has rising edges at the first time 231 and the ninth time 239 and a falling edge at the fifth time 235. The reference clock signal CLKREF has rising edges at the first through ninth times 231-239. The serial input signal DIN is one cycle of the reference clock signal CLKREF earlier in the example timing of FIG. 2C in comparison to FIG. 2B. Accordingly, the serial input signal DIN begins the zero value of the zero-one sequence before the first time 231, transitions to the one value of the zero-one sequence between the second time 232 and the third time 233, and transitions back to the zero value between the sixth time 236 and the seventh time 237. The demultiplexer 107 samples the values on the serial input signal DIN at the first through eighth times 231-238 to produce the first through eighth sampled input signals Q[0:7], respectively. Since the serial input signal DIN is a zero at the first through second times 231-232 and a one at the third through fifth times 233-235, the first five sampled input signals Q[0:4] have values 0, 0, 1, 1, 1. Accordingly, the edge detector 127 identifies a data edge at bit position 2 and sets the phase select signal PHASE to 0.

Figure 2D:
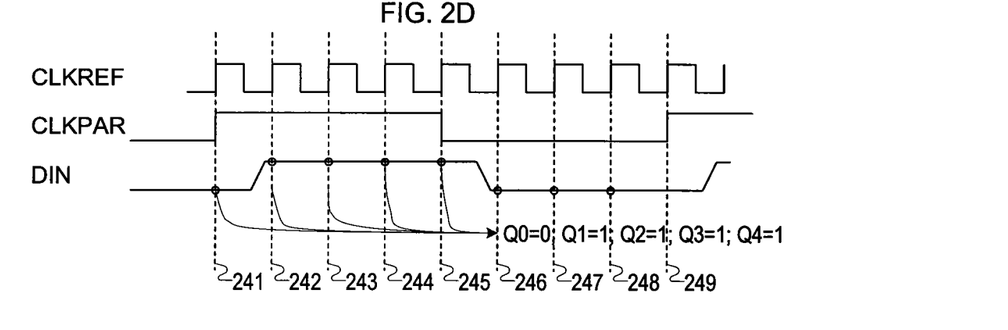

FIG. 2D is a timing diagram that shows operation of the CDR for a fourth exemplary clock signal and serial input signal timing. FIG. 2D includes first through ninth times 241-249 that are times when the demultiplexer 107 samples the serial input signal DIN. The parallel clock signal CLK-PAR has rising edges at the first time 241 and the ninth time 249 and a falling edge at the fifth time 245. The reference clock signal CLKREF has rising edges at the first through ninth times 241-249. The serial input signal DIN is one cycle of the reference clock signal CLKREF earlier in the example timing of FIG. 2D in comparison to FIG. 2C. Accordingly, the serial input signal DIN begins the zero value of the zero-one sequence before the first time 241, transitions to the one value of the zero-one sequence between the first time 241 and the second time 242, and transitions back to the zero value between the fifth time 245 and the sixth time 246. The demultiplexer 107 samples the values on the serial input signal DIN at the first through eighth times 241-248 to produce the first through eighth sampled input signals Q[0:7], respectively. Since the serial input signal DIN is a zero at the first time 241 and a one at the second through fifth times 242-245, the first five sampled input signals Q[0:4] have values 0, 1, 1, 1, 1. Accordingly, the edge detector 127 identifies a data edge at bit position 1 and sets the phase select signal PHASE to 3.

Figure 3:
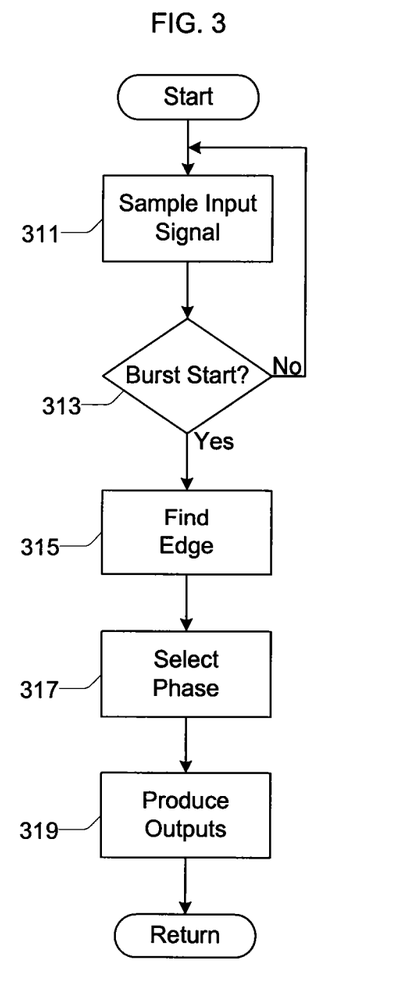
FIG. 3 is a flowchart of a clock and data recovery process in accordance with aspects of the invention.

FIG. 3 is a flowchart of a process for receiving burst-mode serial data in accordance with aspects of the invention. The process may be performed by a CDR, for example, the CDR described above with reference to FIG. 1. The process may be initiated, for example, by activation of a communication link supplying an input signal to the process. In block 311 the process samples a serial data signal received on the input signal to produce sampled signals. The process utilizes oversampling, that is, the serial data signal is sampled at a rate that is higher than the data rate of the serial data signal. Accordingly, multiple bits of the sampled signals correspond to each bit of the serial data.

In block 313, the process checks for the start of a burst. If the start of a burst is present, the process continues to block 315; otherwise, the process returns to block 311. Whether the start of a burst is present may be based on a control signal received by the process. For example, the control signal may be active at the start of a burst and inactive at other times.

In block 315, the process finds an edge in the sampled signals. In some embodiments, the process may find an edge by comparing values of the sampled signals. The comparison may be performed on pairs of the sampled signals that correspond to consecutive time points, and an edge may be considered to be found when the signals in a pair have different values. The process then continues to block 317.

In block 317, the process selects a phase to use in producing output data signals. In some embodiments, the process selects the phase by adding one-half the number of samples per bit of the serial data to the location of the edge found in block 315. The process then continues to block 319.

In block 319, the process selects signals from the sampled signals to be outputs of the process. The process selects signals utilizing the phase selected in block 317. In some embodiments, the process selects signals by selecting the sample signals at the bit position signaled by a phase select signal and bit positions separated by the number of samples per bit of the serial data. The selection is performed using the same phase throughout the burst that started in block 313. Thereafter, the process returns.

Figure 4:
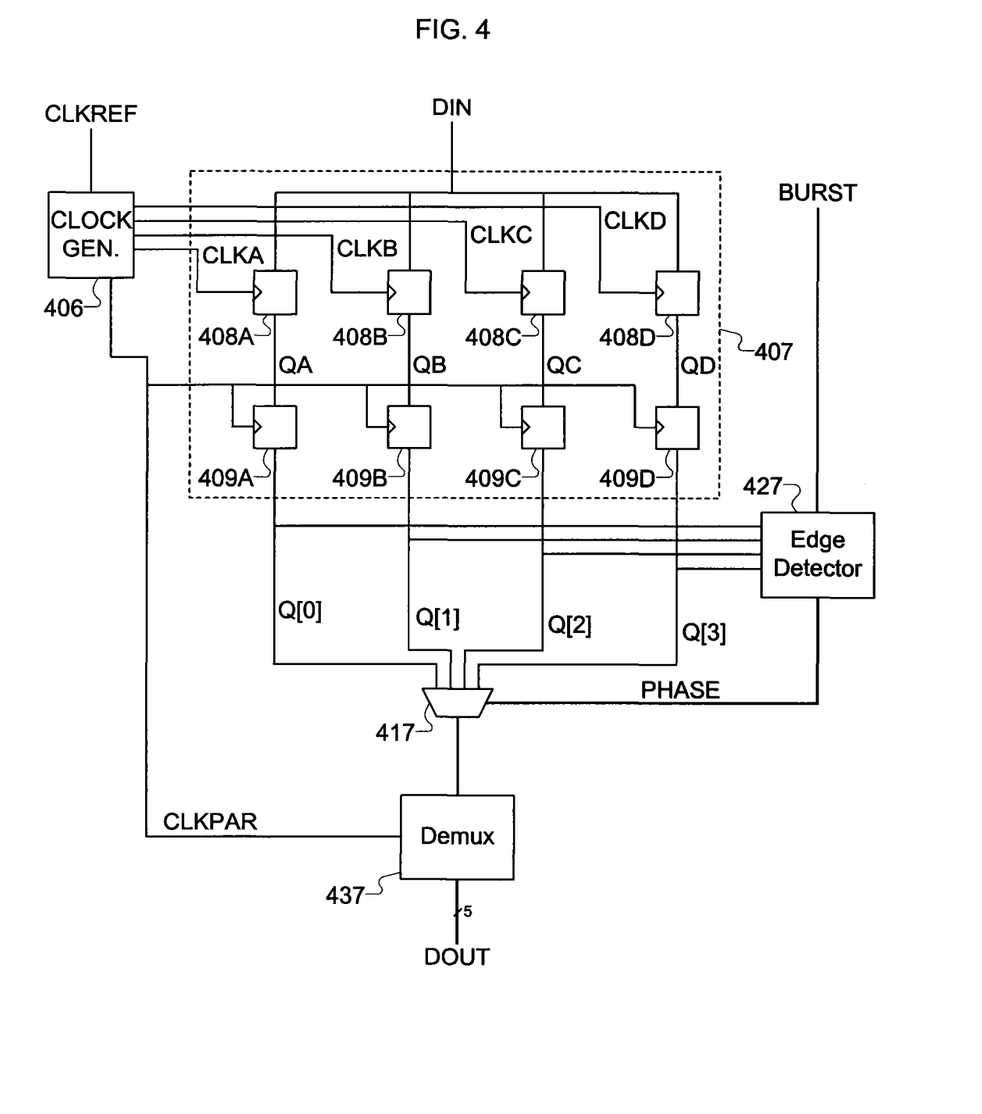
FIG. 4 is a block diagram of another clock and data recovery circuit in accordance with aspects of the invention.

FIG. 4 is a block diagram of another embodiment of a CDR in accordance with aspects of the invention. The CDR includes a sampler 407 that receives a serial input signal DIN and supplies sampled input signals Q. An edge detector 427 receives the sampled input signals Q and supplies a phase select signal PHASE. A selector 417 receives the sampled input signals Q and the phase select signal PHASE and produces a selected signal. A demultiplexer 437 receives the selected signal and produces parallel output signals DOUT. A clock generator 406 receives a reference clock signal CLKREF and produces sample clock signals CLKA-CLKD for use by the sampler 407.

The CDR operates in a manner similar to the CDR described above with reference to FIG. 1. The CDR receives a serial input signal DIN that conveys a serial stream of data bits which the CDR processes to produce parallel output signals DOUT. The CDR recovers data by operating to produce the parallel output signals DOUT so that values of the parallel output signals DOUT substantially match values used by a transmitter to produce the serial input signal DIN.

The sampler 407 produces the sampled input signals Q so that the sampled input signals Q convey values of the serial input signal DIN from distinct time points. The distinct time points occur within one bit time of serial input signal DIN. However, the samples may not be aligned with bit boundaries in the serial input signal DIN. As illustrated in the embodiment of FIG. 4, the sampler 407 may oversample by a factor of four to produce four parallel signals forming the sampled input signals Q.

The sampler 407 includes sample latches 408A-408D used to produce the sampled input signals Q from the serial input signal DIN. Each of the sample latches 408A-408D receives the serial input signal DIN and one of the sample clock signals CLKA-CLKD and produces an output signal with the value of the serial input signal DIN at times triggered by the corresponding one of the sample clock signals CLKA-CLKD. The sampler 407 includes retiming latches 409A-409D to time align the output signals from the sample latches 408A-408D. The retiming latches 409A-409D receive the output signals from the sample latches 408A-408D and produce the sampled input signals Q at times triggered by a parallel clock signal CLKPAR. In embodiments with a different oversampling factor, the sampler 407 has a corresponding different number of sample clock signals and latches.

The edge detector 427 produces the phase select signal PHASE to indicate which of the sampled input signals Q the selector 417 is to select. The edge detector 427 is similar to the edge detector 127 of the embodiment of FIG. 1. However, the oversampled signals Q span slightly less than one bit time of the serial data, and in some circumstances there may be no edge in the signals received by the edge detector 427. In such circumstances, the edge detector 427 may produce a phase select signal PHASE with a middle value, for example, a phase value of two in an embodiment with four samples per bit.

The selector 417 receives the sampled input signals Q and supplies a selected one to a demultiplexer 437. The selector 417 utilizes the phase select signal PHASE from the edge detector 427 to determine which of the sampled input signals Q is supplied to the output.

The CDR determines the timing phase of a burst of data using the sampler 407 and the edge detector 427. Phase information from the edge detector 427 is used in the selector 417 to choose which signal from the sampler 407 to use to produce the parallel output signals DOUT. The signal from the sampler 407 that will be used to produce the parallel output signals DOUT is determined at the beginning of a burst and held for the duration of the burst.

The demultiplexer 437 receives the selected signal from selector 417 and performs serial-to-parallel conversion to produce the parallel output signals DOUT. In addition to the selected signal from the selector 417, the demultiplexer 437 may receive the parallel clock signal CLKPAR for use in timing signal transitions. The demultiplexer 437 may include data latches and associated control circuitry.

The clock signal generator 406 produces the sample clock signals CLKA-CLKD for use by the sampler 407. Generally, the sample clock signals CLKA-CLKD oscillate at the same frequency with evenly spaced phases and, correspondingly, signal transitions that are evenly spaced in time. In one embodiment, the reference clock signal CLKREF oscillates at a frequency approximately matching the nominal data rate of the serial input signal DIN, and the sample clock signals CLKA-CLKD oscillate at the same frequency as the reference clock signal CLKREF. In some embodiments, the clock signal generator 406 utilizes a phase-lock loop or delay-locked loop to produce the sample clock signals CLKA-CLKD. The clock signal generator 406, in some embodiments, produces the parallel clock signal CLKPAR used by the sampler 407 to synchronize the sampled input signals Q. In one embodiment, the parallel clock signal CLKPAR is produced by buffering the reference clock signal CLKREF.

Figure 5:
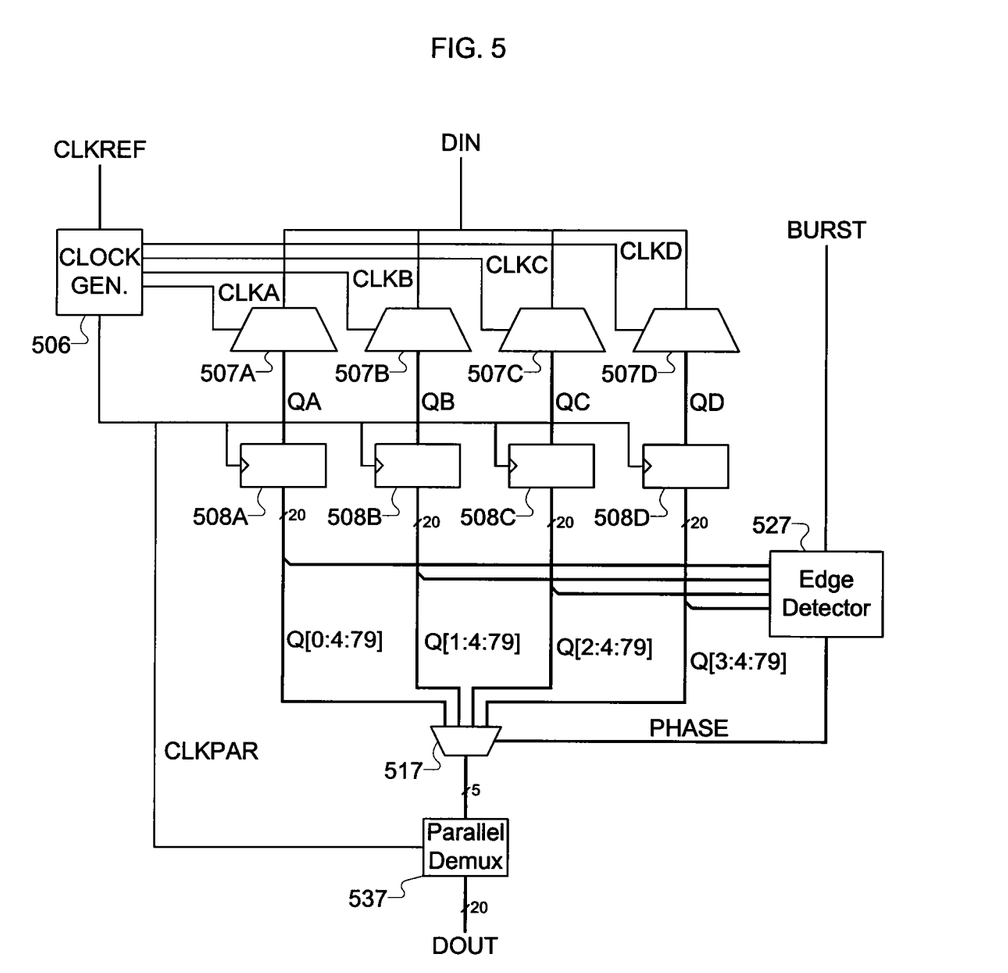
FIG. 5 is a block diagram of another clock and data recovery circuit in accordance with aspects of the invention.

FIG. 5 is a block diagram of another embodiment of a CDR in accordance with aspects of the invention. The CDR includes a first plurality of demultiplexers 507 that receive a serial input signal DIN and supply sampled input signals Q via retiming registers 508. An edge detector 527 receives a subset of the sampled input signals Q and supplies a phase select signal PHASE. A selector 517 receives the sampled input signals Q and the phase select signal PHASE and produces selected signals. A final demultiplexer 537 receives the selected signals and produces parallel output signals DOUT. A clock signal generator 506 produces reference clock signals for use by the first plurality of demultiplexers 507.

The CDR operates in a manner similar to the CDRs described above with reference to FIGS. 1 and 4. The CDR receives a serial input signal DIN that conveys a serial stream of data bits which the CDR deserializes to produce parallel output signals DOUT. The CDR operates to produce the parallel output signals DOUT so that values of the parallel output signals DOUT substantially match values used by a transmitter to produce the serial input signal DIN.

The first plurality of demultiplexers 507 may be considered input demultiplexers. Each of the input demultiplexers is similar to or the same as the demultiplexer 107 of the embodiment of FIG. 1. However, each of the input demultiplexers operates with different timing depending on which one of the reference clock signals the input demultiplexer receives. Each input demultiplexer may obtain multiple samples of the serial input signal for each of multiple sequential bit times. The CDR has an overall oversampling factor that is the product of the number of input demultiplexers and the oversampling rate of each of the demultiplexers. In some embodiments, the oversampling rate of each of the input demultiplexers is one. In some embodiments, some circuitry is shared between the input demultiplexers.

In one embodiment, as shown in FIG. 5, the CDR includes first through fourth demultiplexers 507A-507D that produce first through fourth demultiplexed input signals QA-QD, respectively, utilizing first through fourth reference clock signals CLKA-CLKD, respectively. The first through fourth demultiplexers combine oversampling by a factor of four with deserialization by five so that the first through fourth demultiplexed input signals QA-QD total eighty signals. Accordingly, one set of values, or word, of the first through fourth demultiplexed input signals QA-QD spans five bit times of the input data with sixteen samples per bit time. However, the samples may not be aligned with bit boundaries in the serial input signal DIN. In other embodiments, the number of input demultiplexers may differ, and the input demultiplexers may use a different oversampling factor or deserialization bit width.

The retiming registers 508 latch the signals from the first plurality of demultiplexers 507 to produce the sampled input signals Q. The signals from each of the first plurality of demultiplexers 507 transition in value at times that are staggered relative to transitions of signals from the other demultiplexers. The timing of the transitions of signals from one of the first plurality of demultiplexers depends on the timing of the reference clock signal used by the demultiplexer. The retiming registers 508 time align the sampled input signals Q. In one embodiment as shown in FIG. 5, the CDR includes first through fourth retiming registers 507A-507D. The first through fourth retiming registers 507A-507D receive the first through fourth demultiplexed input signals QA-QD, respectively. The retiming registers 507 may store the received data at times signaled by a parallel clock signal CLKPAR.

The edge detector 527 produces the phase select signal PHASE and is similar to or the same as the edge detector 127 of the embodiment of FIG. 1 or the edge detector 427 of the embodiment of FIG. 4. Accordingly, the phase select signal signals which of the sampled input signals Q will be used to produce the CDR outputs, and the phase select signal is determined at the beginning of a burst for use throughout the burst.

The selector 517 supplies the selected signals to the final demultiplexer 537 utilizing the phase selection signal PHASE from the edge detector 527 to determine which of the sampled input signals Q are output from selector. The selector 517 is similar to or the same as the selector 117 of the embodiment of FIG. 1. The number of sampled input signals Q supplied to the output matches the deserialization bit width of the demultiplexers 507, and the selected bits are separated by the overall oversampling factor. When the overall oversampling factor is sixteen, as illustrated in the embodiment of FIG. 5, every sixteenth one of the sampled input signals Q is selected.

The final demultiplexer 537 receives the selected signals from the selector and further demultiplexes the selected signals to produce the parallel output signals DOUT. The final demultiplexer 537 may be considered a parallel demultiplexer. The parallel demultiplexer performs time-division demultiplexing on each of the selected signals from the selector. In the embodiment of FIG. 5, the final demultiplexer 537 demultiplexes by a factor of four to produce twenty output signals from the five signals received. In addition to the selected signals from the selector 517, the final demultiplexer 537 may receive the parallel clock signal CLKPAR for use in timing operations. The final demultiplexer 537 may include data latches and associated control circuits.

The clock signal generator 506 produces the reference clock signals used by the first plurality of demultiplexers 507 utilizing an input clock signal CLKREF. In one embodiment, the input clock signal CLKREF oscillates at a frequency approximately matching the sampling rate of the input demultiplexers and the reference clock signals CLKA-CLKD oscillate at the same frequency. However, the reference clock signals have staggered phases that are separated by the number of input demultiplexers. For example, in the embodiment illustrated in FIG. 5, the reference clocks signal oscillate at approximately four times the nominal data rate and are separated by ninety degrees. In some embodiments, the clock signal generator 506 utilizes a delay-locked loop or a phase-locked loop to produce the reference clock signals. The clock signal generator 506 may also produce the parallel clock signal CLKPAR. In some embodiments, the parallel clock signal CLKPAR is produced by dividing down the input clock signal CLKREF based on the deserialization bit width. In some embodiments, some circuitry may be shared between the demultiplexers 507 and the clock signal generator 506.

Although the invention has been discussed with respect to various embodiments, it should be understood the invention comprises the novel and unobvious claims, and their insubstantial variations, supported by this disclosure.

The invention claimed is:

1. A clock and data recovery device, comprising:
   sampling circuitry configured to receive a serial input signal and produce parallel signals by sampling the serial input signal, where multiple samples are produced for each bit time of the serial input signal;
   phasing circuitry coupled to the parallel signals and configured to produce a phase selection signal indicative of the location of a data transition among the parallel signals; and
   selection circuitry coupled to the parallel signals and configured to produce at least one signal selected from the parallel signals based on the phase selection signal,
   wherein the phasing circuitry is further configured to produce the phase selection signal when a burst signal is active and maintain the phase selection signal when the burst signal is not active.

2. The clock and data recovery device of claim 1, wherein the sampling circuitry is further configured to produce the parallel signals based on a reference clock signal.

3. The clock and data recovery device of claim 1, further comprising demultiplexing circuitry coupled to the at least one signal selected by the selection circuitry and configured to produce parallel output signals by demultiplexing the at least one signal selected by the selection circuitry.

4. The clock and data recovery device of claim 1, further comprising clock generation circuitry configured to receive a reference clock signal and produce a plurality of clock signals at a common frequency and distinct phases.

5. The clock and data recovery device of claim 1, wherein the sampling circuitry comprises a plurality latches configured to receive the serial input signal and produce the parallel signals, each of the plurality of latches configured to sample the serial input signal at distinct times.

6. The clock and data recovery device of claim 1, wherein the sampling circuitry comprises: a plurality of deserializers configured to receive the serial input signal and produce the parallel signals, each of the plurality of deserializers configured to sample the serial input signal at distinct times.

7. The clock and data recovery device of claim 6, further comprising registers configured to couple the outputs of the plurality of deserializers to the phasing circuitry and the selection circuitry.

* * * * *